US011229044B2

(12) United States Patent
Tang (10) Patent No.: US 11,229,044 B2
(45) Date of Patent: Jan. 18, 2022

(54) UPLINK TRANSMISSION METHOD, AND TERMINAL DEVICE (71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 22 days.

(21) Appl. No.: 16/619,163

(22) PCT Filed: Aug. 2, 2017

(86) PCT No.: PCT/CN2017/095701
§ 371 (c)(1),
(2) Date: Dec. 4, 2019

(87) PCT Pub. No.: WO2019/024022
PCT Pub. Date: Feb. 7, 2019

(65) Prior Publication Data
US 2020/0163110 A1 May 21, 2020

(51) Int. Cl.
*H04W 72/12* (2009.01)
*H04W 76/30* (2018.01)
(Continued)

(52) U.S. Cl.
CPC ....... *H04W 72/1284* (2013.01); *H04W 12/06* (2013.01); *H04W 72/0413* (2013.01); *H04W 74/0833* (2013.01); *H04W 76/30* (2018.02)

(58) Field of Classification Search
CPC . H04W 72/1284; H04W 76/30; H04W 12/06; H04W 72/0413; H04W 74/0833
See application file for complete search history.

(56) References Cited

U.S. PATENT DOCUMENTS 9,215,729 B2 * 12/2015 Ostergaard ........ H04W 72/0446
2010/0080184 A1 * 4/2010 Tseng ........................ H04L 1/08
370/329
(Continued)

FOREIGN PATENT DOCUMENTS

CN 101877911 11/2010
CN 103039119 4/2013
(Continued)

OTHER PUBLICATIONS

EPO, Communication for EP Application No. 17920237.9, dated Oct. 14, 2020.
(Continued)

*Primary Examiner* — Brenda H Pham
(74) *Attorney, Agent, or Firm* — Hodgson Russ LLP (57) ABSTRACT Provided in an embodiment of the present invention are an uplink transmission method, and a terminal device capable of realizing uplink transmission at existence of multiple scheduling request (SR) configuration information items. The method includes: a terminal device receiving, from a network device, multiple scheduling request (SR) configuration information items, each SR configuration information item comprising a maximum transmission count of a corresponding SR; and the terminal device performing, according to the multiple SR configuration information items, processing of physical uplink control channel (PUCCH) resources corresponding to the multiple SR configuration information items.

16 Claims, 3 Drawing Sheets (51) Int. Cl.
*H04W 12/06* (2021.01)
*H04W 72/04* (2009.01)
*H04W 74/08* (2009.01)

(56) References Cited

U.S. PATENT DOCUMENTS

| | | | |
|---|---|---|---|
| 2011/0019628 A1* | 1/2011 | Tseng | H04W 72/1284 370/329 |
| 2012/0093106 A1* | 4/2012 | Dong | H04W 74/006 370/329 |
| 2013/0028198 A1* | 1/2013 | Yamada | H04W 48/20 370/329 |
| 2016/0029387 A1* | 1/2016 | Uemura | H04W 16/32 370/329 |
| 2016/0270110 A1 | 9/2016 | Dinan | |
| 2016/0270114 A1* | 9/2016 | Dinan | H04L 5/0091 |
| 2017/0064732 A1* | 3/2017 | Wu | H04L 5/0035 |
| 2018/0160423 A1 | 6/2018 | Yan et al. | |

FOREIGN PATENT DOCUMENTS

| | | |
|---|---|---|
| CN | 104170493 | 11/2014 |
| CN | 104322132 | 1/2015 |
| CN | 106211331 | 12/2016 |
| CN | 104322132 | 3/2019 |
| EP | 2426860 | 3/2012 |
| JP | 2011527135 | 10/2011 |
| JP | 2015514344 | 5/2015 |
| JP | 2015520533 | 7/2015 |
| RU | 2605086 | 12/2016 |
| RU | 2609666 | 2/2017 |
| RU | 2619063 | 5/2017 |
| RU | 2619587 | 5/2017 |
| RU | 2625319 | 7/2017 |
| WO | 2016157809 | 10/2016 |
| WO | 2017028038 | 2/2017 |

OTHER PUBLICATIONS

FIPS, Office Action for RU Application No. 2019141055, dated Jan. 13, 2021.
CIPO, Office Action for CA Application No. 3064644, dated Feb. 10, 2021.
IPI, Office Action for IN Application No. 201917050626, dated Mar. 4, 2021.
WIPO, ISR for PCT/CN2017/095701, dated Apr. 27, 2018.
Huawei et al., "Support of multiple SR configurations," 3GPP TSG-RAN2 Meeting #NR_AHs, R2-1706900, Jun. 2017, 5 pages.
Samsung Electronics R&D Institute UK, "Behaviour in case of multiple SR triggers and collision resolution," 3GPP TSG-RAN WG2 NR ad-hoc #2, R2-1706640, Jun. 2017, 3 pages.
Samsung Electronics R&D Institute UK, "General details of SR procedure in NR including SR triggers and timers," 3GPP TSG-RAN WG2 NR ad-hoc #2, R2-1706639, Jun. 2017, 4 pages.
EPO, Office Action for EP Application No. 17920237.9, dated Apr. 17, 2020.
Vice-Chairwoman (Interdigital), Report from NR/LTE Break-Out Session (UP NR, FeD2D, sTTI, Rel-14 corrections), 3GPP TSG-RAN WG2 Meeting #98, May 15, 2017.
Huawei et al., "SR enhancements with multiple numerologies", 3GPP TSG-RAN2 Meeting #98, May 15, 2017.
HTC, "Discussion on details of SR procedures," 3GPP TSG-RAN WG2 AdHoc on NR, R2-1706957, May 2017, 3 pages.
CNIPA, First Office Action for CN Application No. 202010062004.8, dated Apr. 20, 2021.
JPO, Office Action for JP Application No. 2020-500682, dated May 25, 2021.
IPOS, Office Action for SG Application No. 11201910995R, dated Jun. 24, 2021.
CNIPA, Notification to Grant Patent Right for Invention for CN Application No. 202010062004.8, dated Jul. 23, 2021.
Inapi, Office Action for CL Application No. 201903829, dated Jul. 20, 2021.
Vivo, "Enhanced SR in NR," 3GPP TSG-RAN WG2 NR Ad Hoc, R2-1707072 (revision of R2-1704589), Jun. 2017, 3 pages.
TIPO, First Office Action for TW Application No. 107126913, dated Sep. 24, 2021.
KIPO, Office Action for KR Application No. 10-2020-7000004, dated Nov. 11, 2021.
Catt, "Further Consideration on Multiple SR Configurations," 3GPP TSG-RAN WG2 Meeting #NR AH2, R2-1706367, Jun. 2017, 4 pages.

* cited by examiner

UPLINK TRANSMISSION METHOD, AND TERMINAL DEVICE

CROSS-REFERENCE TO RELATED APPLICATION

This application is a U.S. national phase application of International Application No. PCT/CN2017/095701, filed Aug. 2, 2017, the entire disclosure of which is incorporated herein by reference.

TECHNICAL FIELD

The present application relates to the field of communications, and more particularly, to a method for uplink transmission and a terminal device.

BACKGROUND

In the existing discussion of the New Radio (NR), it has been agreed to configure for the terminal device a plurality of Scheduling Requests (SR) configuration information, and the terminal device may indicate to the network device by using the plurality of SR configurations which type of uplink authorization resource is required by the terminal device.

However, the current discussion does not give a clear definition of the SR configuration. Therefore, how to implement uplink transmission under a plurality of SR configurations is an urgent problem to be solved for the terminal device.

SUMMARY

The embodiments of the present application provide a method for uplink transmission and a terminal device, which can implement uplink transmission in a scenario of a plurality of SR configuration information.

In a first aspect, there is provided a method for uplink transmission, including:

receiving, by a terminal device, a plurality of Scheduling Request (SR) configuration information of a network device, wherein each SR configuration information includes a maximum number of transmissions of a corresponding SR; and processing, by the terminal device, Physical Uplink Control Channel (PUCCH) resources corresponding to the plurality of SR configuration information according to the plurality of SR configuration information.

Therefore, according to the method for uplink transmission in the embodiments of the present application, the terminal device can receive a plurality of SR configuration information configured by the network device, each SR configuration information including the maximum number of transmissions of the corresponding SR, and the terminal device can process the PUCCH resources corresponding to the plurality of SR configuration information according to the maximum number of transmissions of the corresponding SR in the plurality of SR configuration information to achieve the uplink transmission.

Optionally, in the embodiments of the present application, the maximum numbers of transmissions of the corresponding SRs included in individual SR configuration information may be the same, or may be different.

In combination with the first aspect, in some implementation manners of the first aspect, the plurality of SR configuration information includes first SR configuration information, the first SR configuration information corresponds to a first SR, and the processing, by the terminal device, the Physical Uplink Control Channel (PUCCH) resources corresponding to the plurality of SR configuration information according to the plurality of SR configuration information includes:

when a number of transmissions of the first SR reaches the maximum number of transmissions of the first SR, releasing, by the terminal device, a PUCCH resource corresponding to the first SR configuration information.

In combination with the first aspect, in some implementation manners of the first aspect, the method further includes:

initiating a random access procedure and requesting to acquire the PUCCH resource corresponding to the first SR configuration information, by the terminal device.

That is, the maximum number of transmissions of the SR included in each SR configuration information is used to determine the release timing of the PUCCH resource corresponding to each SR configuration information, i.e., the maximum number of transmissions of the first SR included in the first SR configuration information is used to determine the release timing of the PUCCH resource corresponding to the first SR configuration information, and the maximum number of transmissions of the second SR included in the second SR configuration information is used to determine the release timing of the PUCCH resource corresponding to the second SR configuration information, that is to say, the release timing of the PUCCH resources corresponding to individual SR configuration information is separately managed.

In combination with the first aspect, in some implementation manners of the first aspect, the plurality of SR configuration information includes second SR configuration information, the second SR configuration information corresponds to a second SR, and the processing, by the terminal device, the Physical Uplink Control Channel (PUCCH) resources corresponding to the plurality of SR configuration information according to the plurality of SR configuration information includes:

when a number of transmissions of the second SR reaches the maximum number of transmissions of the second SR, releasing, by the terminal device, the PUCCH resource corresponding to each SR configuration information.

In combination with the first aspect, in some implementation manners of the first aspect, the method further includes:

clearing downlink allocation information and uplink authorization information delivered by the network device, and cancelling sending each SR to be sent, by the terminal device; and initiating a random access procedure and reconfiguring each of the SR configuration information, by the terminal device.

That is, the PUCCH resources corresponding to individual SR configuration information may be considered to be uniformly managed, i.e., as long as the number of transmissions of the SR corresponding to any SR configuration information reaches the maximum number of transmissions of any SR, the terminal device may be triggered to release the PUCCH resource corresponding to each SR configuration information, or the number of transmissions of any of the SRs reaching the maximum number of transmissions of any of the SRs is the release timing of the PUCCH resource corresponding to each of the SR configuration information.

In combination with the first aspect, in some implementation manners of the first aspect, the plurality of SR configuration information includes third SR configuration information, the third SR configuration information has a higher priority than other SR configuration information, said other SR configuration information includes fourth SR configuration information, the fourth SR configuration information corresponds to a fourth SR, and the processing, by the terminal device, the Physical Uplink Control Channel (PUCCH) resources corresponding to the plurality of SR configuration information according to the plurality of SR configuration information includes:

when a number of transmissions of the fourth SR reaches the maximum number of transmissions of the fourth SR, releasing, by the terminal device, a PUCCH resource corresponding to the fourth SR configuration information.

In combination with the first aspect, in some implementation manners of the first aspect, the method further includes:

sending, by the terminal device, the fourth SR by using the PUCCH resource corresponding to the third SR configuration information.

In combination with the first aspect, in some implementation manners of the first aspect, the plurality of SR configuration information includes third SR configuration information, the third SR configuration information has a higher priority than other SR configuration information, said other SR configuration information includes fourth SR configuration information, the third configuration information corresponds to a third SR, and the processing, by the terminal device, the Physical Uplink Control Channel (PUCCH) resources corresponding to the plurality of SR configuration information according to the plurality of SR configuration information includes:

when a number of transmissions of the third SR reaches the maximum number of transmissions of the third SR, releasing, by the terminal device, the PUCCH resource corresponding to each SR configuration information.

In combination with the first aspect, in some implementation manners of the first aspect, the method further includes:

clearing, by the terminal device, downlink allocation information and uplink authorization information delivered by the network device; and initiating a random access procedure and cancelling sending each SR to be sent, by the terminal device.

In combination with the first aspect, in some implementation manners of the first aspect, a transmission reliability of the PUCCH resource corresponding to the third SR configuration information is higher than a transmission reliability of the PUCCH resource corresponding to the fourth SR configuration information.

In general, the maximum number of transmissions of the SR included in each non-default SR configuration information may be used to determine the release timing of the PUCCH resource corresponding to each non-default SR configuration information, and the maximum number of transmissions of the SR included in the default SR configuration information may be used to determine the release timing of the PUCCH resource corresponding to each SR configuration information.

In a second aspect, there is provided a method for uplink transmission, including:

receiving, by a terminal device, a plurality of Scheduling Request (SR) configuration information of a network device, wherein each SR configuration information includes a maximum number of transmissions of the SR, and the maximum number of transmissions of the SR is used to indicate a cumulative maximum number of transmissions of all the SRs; and processing, by the terminal device, Physical Uplink Control Channel (PUCCH) resources corresponding to the plurality of SR configuration information according to the plurality of SR configuration information.

In combination with the second aspect, in some implementation manners of the second aspect, the processing, by the terminal device, the Physical Uplink Control Channel (PUCCH) resources corresponding to the plurality of SR configuration information according to the plurality of SR configuration information includes:

releasing, by the terminal device, the PUCCH resource corresponding to each SR configuration information, in a case that a cumulative number of transmissions of all the SRs reaches the maximum number of transmissions of the SR.

In the present embodiment, the terminal device may count the number of transmissions of each SR, and processes the PUCCH resource corresponding to each SR configuration information according to the cumulative number of transmissions of all SRs, specifically, when the cumulative number of transmissions of all the SRs reaches the maximum number of transmissions of the SR, the terminal device may release the PUCCH resource corresponding to each SR configuration information.

In combination with the second aspect, in some implementation manners of the second aspect, the method further includes:

clearing, by the terminal device, downlink allocation information and uplink authorization information delivered by the network device; and initiating a random access procedure and cancelling sending each SR to be sent, by the terminal device.

In a third aspect, there is provided a terminal device for executing the method in the above first aspect or any possible implementation manners of the first aspect. In particular, the terminal device includes units for executing the method in the above first aspect or any possible implementation manners of the first aspect.

In a fourth aspect, there is provided a terminal device for executing the method in the above second aspect or any possible implementation manners of the second aspect. In particular, the terminal device includes units for executing the method in the above second aspect or any possible implementation manners of the second aspect.

In a fifth aspect, there is provided a terminal device, including: a memory, a processor, an input interface, and an output interface. The memory, the processor, the input interface, and the output interface are connected by a bus system. The memory is configured for storing instructions, and the processor is configured for executing the instructions stored in the memory for executing the method in the above first aspect or any possible implementation manners of the first aspect.

In a sixth aspect, there is provided a terminal device, including: a memory, a processor, an input interface, and an output interface. The memory, the processor, the input interface, and the output interface are connected by a bus system. The memory is configured for storing instructions, and the processor is configured for executing the instructions stored in the memory for executing the method in the above second aspect or any possible implementation manners of the second aspect.

In a seventh aspect, there is provided a computer storage medium for storing computer software instructions, the computer software instructions are used for executing the method in the above first aspect or any possible implementation manners of the first aspect, or the method in the above second aspect or any possible implementation manners of the second aspect, and the computer storage medium includes a program designed to perform the above aspects.

In an eighth aspect, there is provided a computer program product, and when the computer program product is executed in a computer, the computer is enabled to execute the method in the above first aspect or any optional implementation manners of the first aspect, or the method in the above second aspect or any optional implementation manners of the second aspect.

DETAILED DESCRIPTION

The technical solutions in the embodiments of the present application will be described below with reference to the accompanying drawings in the embodiments of the present application.

The technical solutions of the embodiments of the present application may be applied to various communication systems, for example, a Global System of Mobile communication ("GSM"), a Code Division Multiple Access (CDMA) system, a Wideband Code Division Multiple Access (WCDMA) system, General Packet Radio Service ("GPRS"), a Long Term Evolution ("LTE") system, a LTE Frequency Division Duplex ("FDD") system, LTE Time Division Duplex ("TDD"), a Universal Mobile Telecommunication System ("UMTS"), a Worldwide Interoperability for Microwave Access ("WiMAX") communication system, or a future 5G system, and the like.

Figure 1:
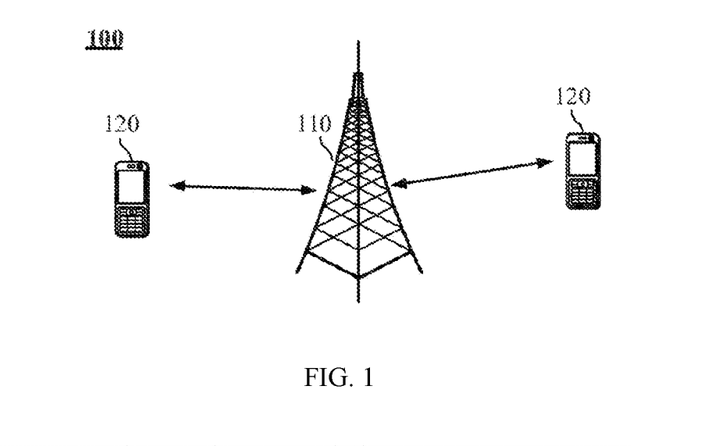
FIG. 1 is a schematic diagram of a communication system according to an embodiment of the present application.

FIG. 1 shows a wireless communication system 100 to which an embodiment of the present application is applied. The wireless communication system 100 may include a network device 110. The network device 110 may be a device that communicates with a terminal device. The network device 110 may provide communication coverage for a particular geographic area and may communicate with the terminal device (e.g., UE) located within the coverage area. Optionally, the network device 110 may be a base station (Base Transceiver Station, BTS) in the GSM system or the CDMA system, or may be a base station (NodeB, NB) in the WCDMA system, or may be an evolved base station (Evolutional Node B, eNB or eNodeB) in the LTE system, or a wireless controller in a Cloud Radio Access Network (CRAN), or the network device may be a relay station, an access point, an in-vehicle device, a wearable device, a network side device in a future 5G network or a network device in a Public Land Mobile Network (PLMN) in the future.

The wireless communication system 100 also includes at least one terminal device 120 located within the coverage of the network device 110. The terminal device 120 may be mobile or fixed. Optionally, the terminal device 120 may refer to an access terminal, a User Equipment (UE), a subscriber unit, a subscriber station, a mobile station, a mobile stage, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to a wireless modem, an in-vehicle device, a wearable device, a terminal device in future 5G network, or a terminal device in future evolved PLMN, and the like.

Optionally, Device to Device (D2D) communication may be performed between the terminal devices 120.

Optionally, the 5G system or network may also be referred to as a New Radio (NR) system or network.

FIG. 1 exemplarily shows one network device and two terminal devices. Alternatively, the wireless communication system 100 may include a plurality of network devices and may include other numbers of terminal devices within the coverage of each network device, which is not limited by the embodiments of the present application.

Optionally, the wireless communication system 100 may further include other network entities, such as a network controller, a mobility management entity, and the like, which is not limited by the embodiments of the present application.

It should be understood that the terms "system" and "network" are used interchangeably herein. The term "and/or" in the present disclosure is merely used for describing an association between the associated objects, indicating that there may be three relationships, for example, A and/or B may indicate three situations: A exists separately, both A and B exist at the same time, and B exists separately. In addition, the character "/" in the present disclosure generally indicates that the contextual objects has an "or" relationship.

The triggering process of the SR specified in the existing Medium Access Control (MAC) protocol is: when the terminal device has data to be sent, optionally, the data may be data cached in a Radio Link Control (RLC) Layer or a Packet Data Convergence Protocol (PDCP) layer, the terminal device may determine whether there is a PUCCH resource in a current Transmission Time Interval (TTI), and if there is the Physical Uplink Control Channel (PUCCH) resource, and a timer (sr-ProhibitTimer) for limiting a number of transmissions of SR is not running, a MAC layer of the terminal device instructs the physical layer to transmit the SR on the corresponding PUCCH resource.

As described above, in the existing NR discussion, the terminal device may be configured with a plurality of SR configuration information, by which it is possible to indicate to the network device which type of uplink authorization resource is required by the terminal device. However, in the current discussion, the specific content included in the SR configuration information is not clearly defined. Therefore, in the scenario where the terminal device is configured with a plurality of SR configuration information, it is an urgent problem to be solved how the terminal device could manage the PUCCH resources corresponding to individual SR configuration information to achieve uplink transmission.

Figure 2:
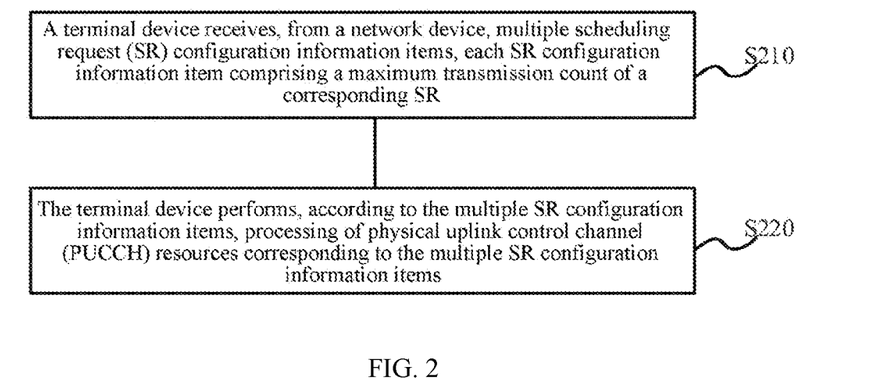
FIG. 2 is a schematic flowchart of a method for uplink transmission according to an embodiment of the present application.

FIG. 2 is a schematic flowchart of a method 200 for uplink transmission according to an embodiment of the present application. As shown in FIG. 2, the method 200 includes the following steps.

In S210, a terminal device receives a plurality of Scheduling Request (SR) configuration information of a network device, where each SR configuration information includes a maximum number of transmissions of a corresponding SR.

In S220, the terminal device processes Physical Uplink Control Channel (PUCCH) resources corresponding to the plurality of SR configuration information according to the plurality of SR configuration information.

In the embodiments of the present application, the network device may configure a plurality of SR configuration information for the terminal device, and each SR configuration information is used to indicate configuration information of the corresponding SR. For example, each of the SR configuration information may include a maximum number of transmissions of the corresponding SR, where the maximum number of transmissions of the SR is used to prevent the SR from being frequently transmitted to occupy the PUCCH resource. Optionally, each of the SR configuration information may further include a PUCCH resource for transmitting a corresponding SR, where the PUCCH resource may include a time domain resource and/or a frequency domain resource of PUCCH for transmitting the SR.

Optionally, each of the SR configuration information may further include other configuration information in the existing SR configuration, which is not limited by the embodiments of the present application.

It should be noted that, in the embodiments of the present application, the maximum numbers of transmissions of the corresponding SRs included in individual SR configuration information may be the same or different, which is not specifically limited in the embodiments of the present application.

For example, the plurality of SR configuration information includes first SR configuration information and second SR configuration information, where the first SR configuration information corresponds to a first SR, and the second SR configuration information corresponds to a second SR. The first SR configuration information includes a maximum number of transmissions of the first SR, and the maximum number of transmissions of the first SR is used to indicate a maximum number of times that the first SR may be frequently transmitted. The second SR configuration information includes a maximum number of transmissions of the second SR, and the maximum number of transmissions of the second SR is used to indicate the maximum number of times that the second SR may be frequently transmitted. The maximum number of transmissions of the first SR and the maximum number of transmissions of the second SR may be the same or different.

In the embodiments of the present application, the terminal device may process the PUCCH resources corresponding to the plurality of SR configuration information according to the plurality of SR configuration information, for example, the terminal device may, according to the maximum number of transmissions of a certain SR in each SR configuration information, determine a release timing of a corresponding PUCCH resource; or the terminal device may determine the release timing of each PUCCH resource according to the maximum number of transmissions of each of the plurality of SR configuration information, that is, the terminal device may uniformly manage or separately manage the PUCCH resources corresponding to individual SR configuration information according to the plurality of SR configuration information, which is not limited in the embodiments of the present application.

First Embodiment

The plurality of SR configuration information includes first SR configuration information, the first SR configuration information corresponds to the first SR, and the S220 may include:

if the number of transmissions of the first SR reaches the maximum number of transmissions of the first SR, the terminal device releases the PUCCH resource corresponding to the first SR configuration information.

The first SR configuration information is any one of the plurality of SR configuration information, and when the number of transmissions of the first SR reaches the maximum number of transmissions of the first SR, the terminal device may release the PUCCH resource corresponding to the first SR configuration information without releasing the PUCCH resource corresponding to the other SR configuration information. Specifically, the MAC entity of the terminal device may notify the Radio Resource Control (RRC) entity of the terminal device to release the PUCCH resource corresponding to the first SR configuration information, and after the MAC entity of the terminal device notifies the RRC entity to release the PUCCH resource corresponding to the first SR configuration information, the RRC entity of the terminal device may notify the RRC entity of the network device that the terminal device has released the PUCCH resource corresponding to the first SR configuration information, so that when reconfiguring the plurality of SR configuration information, the RRC entity of the network device may only reconfigure the released PUCCH resource, i.e., the PUCCH resource corresponding to the first SR configuration information.

It should be noted that, in the embodiments of the present application, the reconfiguration of the PUCCH resource corresponding to the first SR configuration information may refer to configuring the PUCCH resource corresponding to the first SR configuration information as an original value, or configuring to be a value different from the original value. For example, when the original value of a period of the PUCCH resource corresponding to the first SR configuration information is 4, the period value of the reconfigured PUCCH resource may be 4, or may be other values, which is not limited by the embodiments of the present application.

In the first embodiment, the maximum number of transmissions of the SR included in each SR configuration information is used to determine the release timing of the PUCCH resource corresponding to each SR configuration information, that is, the maximum number of transmissions of the first SR included in the first SR configuration information is used to determine the release timing of the PUCCH resource corresponding to the first SR configuration information, and the maximum number of transmissions of the second SR included in the second SR configuration information is used to determine the release timing of the PUCCH resource corresponding to the second SR configuration information. That is to say, the release timing of the PUCCH resources corresponding to individual SR configuration information is separately managed.

Optionally, after the PUCCH resource corresponding to the first SR configuration information is released, the terminal device may cancel the first SR to be sent, that is, after the PUCCH resource used to send the first SR is released, the terminal device may choose not to send the first SR, or the terminal device may send the first SR by using other PUCCH resource that is not released, which is not limited in the embodiments of the present application.

Further, the method 200 may further include:

initiating a random access procedure and requesting to acquire a PUCCH resource corresponding to the first SR configuration information, by the terminal device.

That is, in a case that the PUCCH resource corresponding to the first SR configuration information is released, the terminal device may also initiate a random access procedure, and requests to acquire a PUCCH resource corresponding to the first SR configuration information. The specific implementation process of requesting to acquire the PUCCH resource for sending the SR is similar to the related art, and details are not described herein again.

Second Embodiment

The plurality of SR configuration information includes second SR configuration information, the second SR configuration information corresponds to the second SR, and the S220 includes:

if the number of transmissions of the second SR reaches the maximum number of transmissions of the second SR, releasing, by the terminal device, the PUCCH resource corresponding to each SR configuration information.

The second SR configuration information is any one of the plurality of SR configuration information, and the second SR configuration information and the first SR configuration information may be the same SR configuration information, or may be different SR configuration information.

In the second embodiment, when the number of transmissions of the SR corresponding to any one of the plurality of SR configuration information reaches the maximum number of transmissions of any of the SRs, the terminal device releases the PUCCH resource corresponding to each of the SR configuration information. In the second embodiment, the PUCCH resource corresponding to each of the SR configuration information may be considered to be uniformly managed, that is, when the number of transmissions of the SR corresponding to any SR configuration information reaches the maximum number of transmissions of any of the SRs, the terminal device may be triggered to release the PUCCH resource corresponding to each SR configuration information, in other words, the maximum number of transmissions of any SR reaching the maximum number of transmissions of the SR is a releasing timing for the terminal device to release the PUCCH resource corresponding to each SR configuration information.

Similar to the foregoing embodiment, after the MAC entity of the terminal device notifies the RRC entity to release the PUCCH resource corresponding to each SR configuration information, the RRC entity of the terminal device may further notify the RRC entity of the network device that the terminal device has released the PUCCH resource corresponding to each SR configuration information. In this way, when reconfiguring the plurality of SR configuration information, the RRC entity of the network device may reconfigure the PUCCH resource corresponding to each SR configuration information.

Further, the method 200 further includes:

clearing downlink allocation information and uplink authorization information delivered by the network device, and cancelling sending each SR to be sent, by the terminal device; and initiating a random access procedure and reconfiguring each of the SR configuration information, by the terminal device.

Specifically, after the terminal device releases the PUCCH resource corresponding to each of the SR configuration information, the terminal device may further clear the downlink allocation information and the uplink authorization information that are issued by the network device (referred to as step 1). The downlink allocation information and the uplink authorization information include a resource of a data channel, that is, the downlink allocation information and the uplink authorization information are information of a resource for transmitting data on the data channel. For example, the downlink allocation information may include the resource of the downlink data channel, and the uplink grant information may include the resource of the uplink data channel.

Optionally, since the PUCCH resource corresponding to each SR configuration information is released at this time, the terminal device may also cancel sending each SR to be sent (referred to as step 2).

Optionally, the terminal device may further initiate a random access procedure (referred to as step 3), and request to acquire a PUCCH resource corresponding to each of the plurality of SR configuration information.

Optionally, the terminal device may further receive a plurality of SR configuration information sent by the network device (referred to as step 4), where the plurality of SR configuration information is used to reconfigure each of the SR configuration information.

It should be understood that the order of the above-mentioned steps 1 to 4 does not mean the order of execution, and the order of execution of each step should be determined by its function and internal logic, and should not be construed as limiting the implementation process of the embodiments of the present application.

Third Embodiment

The plurality of SR configuration information includes third SR configuration information, the third SR configuration information has a higher priority than other SR configuration information, the other SR configuration information includes fourth SR configuration information, the fourth SR configuration information corresponds to the fourth SR, and S220 may include:

if the number of transmissions of the fourth SR of the plurality of SRs reaches the maximum number of transmissions of the fourth SR, the terminal device releasing the PUCCH resource corresponding to the fourth SR configuration information.

In the third embodiment, the third SR configuration information has a higher priority than the other SR configuration information. It may be understood that the third SR configuration information is the default SR configuration information, and the other SR configuration information is the non-default SR configuration information. When the PUCCH resource corresponding to the other SR configuration information is released, the terminal device may use the PUCCH resource corresponding to the default SR configuration information, i.e., the third SR configuration information, to transmit the corresponding SR.

In the third embodiment, the release timing of the PUCCH resource corresponding to the non-default SR configuration information may be that the number of transmissions of the SR corresponding to the non-default SR configuration information reaches the maximum number of transmissions of the non-default SR. For example, the non-default SR configuration information includes the fourth SR configuration information, the fourth SR configuration information is corresponding to the fourth SR, and when the number of transmissions of the fourth SR reaches the maximum number of transmissions of the fourth SR, the terminal device may release the PUCCH resource corresponding the fourth SR configuration information without releasing the PUCCH resource corresponding to the other SR configuration information.

That is, the maximum number of transmissions of the SR included in each non-default SR configuration information is used to determine the release timing of the PUCCH resource corresponding to each non-default SR configuration information, i.e., in the third embodiment, the release timing of the PUCCH resource corresponding to each non-default SR configuration information is separately managed.

Further, the method 200 further includes:

the terminal device sending the fourth SR by using the PUCCH resource corresponding to the third SR configuration information.

Specifically, if the PUCCH resource corresponding to the fourth SR configuration information has been released, the terminal device may transmit the fourth SR by using the PUCCH resource corresponding to the default SR configuration information, i.e., the third SR configuration information. That is, when the PUCCH resource corresponding to the non-default SR configuration information is released, if the terminal device needs to transmit the SR corresponding to the non-default SR configuration information, the PUCCH resource corresponding to the default SR configuration information may be used.

Optionally, in the embodiments of the present application, the transmission reliability of the PUCCH resource corresponding to the third SR configuration information is higher than the transmission reliability of the PUCCH resource corresponding to the fourth SR configuration information.

For example, the PUCCH resource corresponding to the third SR configuration information has a lower code rate and/or higher transmission power and the like than the PUCCH corresponding to the fourth SR configuration information.

In the third embodiment, S220 may further include:

if the number of transmissions of the third SR reaches the maximum number of transmissions of the third SR, the terminal device releasing the PUCCH resource corresponding to each SR configuration information.

That is, the maximum number of transmissions of the SR included in the default SR configuration information is used to determine the release timing of the PUCCH resource corresponding to each SR configuration information, that is, when the number of transmissions of the SR corresponding to the default SR configuration information reaches the maximum number of transmissions of the SR, the terminal device releases the PUCCH resource corresponding to each SR configuration information.

In general, the maximum number of transmissions of the SR included in each non-default SR configuration information is used to determine the release timing of the PUCCH resource corresponding to each non-default SR configuration information, and the maximum number of transmissions of the SR included in the default SR configuration information may be used to determine a release timing of the PUCCH resource corresponding to each SR configuration information.

Further, the method 200 further includes:

the terminal device clearing downlink allocation information and uplink authorization information delivered by the network device; and the terminal device initiating a random access procedure and cancelling sending each SR to be sent.

After the terminal device releases the PUCCH resource corresponding to each SR configuration information, the terminal device may perform the foregoing steps 1 to 4. The specific implementation process is similar to the foregoing embodiments, and details are not given herein again.

Figure 3:
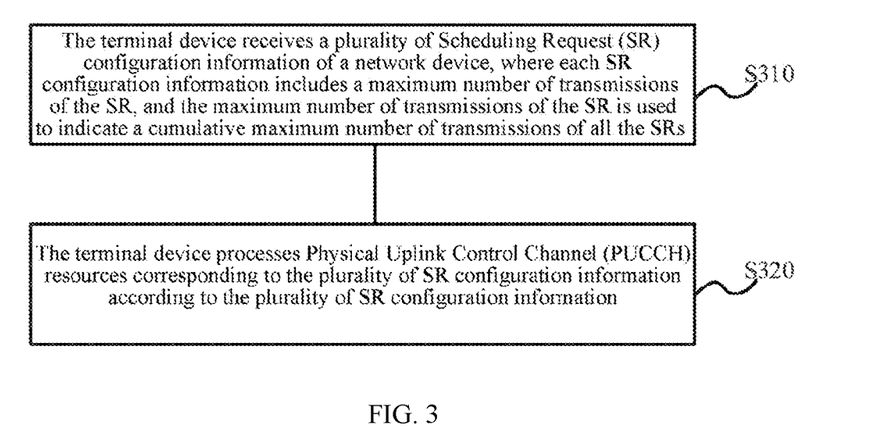
FIG. 3 is a schematic flowchart of a method for uplink transmission according to another embodiment of the present application.

FIG. 3 is a schematic flowchart of a method for uplink transmission according to another embodiment of the present application. As shown in FIG. 3, the method 300 includes the following steps.

In S310, a terminal device receives a plurality of Scheduling Request (SR) configuration information of a network device, where each SR configuration information includes a maximum number of transmissions of the SR, and the maximum number of transmissions of the SR is used to indicate a cumulative maximum number of transmissions of all the SRs.

In S320, the terminal device processes Physical Uplink Control Channel (PUCCH) resources corresponding to the plurality of SR configuration information according to the plurality of SR configuration information.

In this embodiment, each SR configuration information includes the maximum transmission number information of the SR. The difference from the foregoing embodiment is that the maximum number of transmissions of the SR is used to indicate the cumulative maximum number of transmissions of all SRs. In other words, the terminal device may count the number of transmissions of each SR, and process the PUCCH resource corresponding to each SR configuration information according to the cumulative number of transmissions of all SRs. For example, when the cumulative number of transmissions of all the SRs reaches the maximum number of transmissions of the SR, the terminal device may release the PUCCH resource corresponding to each SR configuration information.

Optionally, in some possible embodiments, S320 may include:

in a case that the cumulative number of transmissions of all the SRs reaches the maximum number of transmissions of the SR, the terminal device releasing the PUCCH resource corresponding to each SR configuration information of the plurality of SRs.

For example, the maximum number of transmissions of the SR included in each SR configuration information is 5, the plurality of SR configuration information includes 3 SR configuration information, which are first SR configuration information, second SR configuration information, and third SR configuration information, and corresponding to the first SR, the second SR, and the third SR respectively, and the maximum number of transmissions of the SRs included in each SR configuration information is 5, when the number of transmissions of the first SR is 2, the number of transmissions of the second SR is 1, and when the number of transmissions of the third SR is 2, the number of transmissions of all the SRs reaches the maximum number of transmissions of the SR, i.e., 5, then the terminal device releases the PUCCH resource corresponding to each SR configuration information.

Optionally, in some possible embodiments, the method 300 further includes:

the terminal device clearing downlink allocation information and uplink authorization information delivered by the network device; and the terminal device initiating a random access procedure and cancelling sending each SR to be sent.

After the terminal device releases the PUCCH resource corresponding to each SR configuration information, the terminal device may perform the foregoing steps 1 to 4. The specific implementation process is similar to the foregoing embodiment, and details are not given herein again.

The method embodiments of the present application have been described in detail above with reference to FIG. 2 and FIG. 3, and the apparatus embodiments of the present application will be described in detail below with reference to FIG. 4 to FIG. 7. It should be understood that the apparatus embodiments and the method embodiments correspond to each other, and similar description may be referred to the method embodiments.

Figure 4:
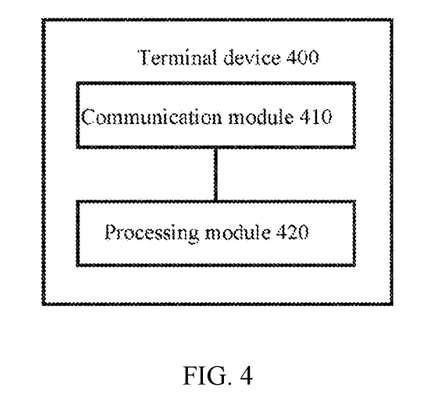
FIG. 4 is a schematic block diagram of a terminal device according to an embodiment of the present application.

FIG. 4 shows a schematic block diagram of a terminal device 400 according to an embodiment of the present application. As shown in FIG. 4, the terminal device 400 includes:

a communication module 410, configured to receive a plurality of Scheduling Request (SR) configuration information of a network device, where each SR configuration information includes a maximum number of transmissions of a corresponding SR; and a processing module 420, configured to process Physical Uplink Control Channel (PUCCH) resource corresponding to the plurality of SR configuration information according to the plurality of SR configuration information.

Optionally, in some possible embodiments, the plurality of SR configuration information includes first SR configuration information, the first SR configuration information corresponds to the first SR, and the processing module 420 is specifically configured to:

if a number of transmissions of the first SR reaches the maximum number of transmissions of the first SR, release the PUCCH resource corresponding to the first SR configuration information.

Optionally, in some possible embodiments, the processing module 420 is further configured to:

initiate a random access procedure, and request to acquire a PUCCH resource corresponding to the first SR configuration information.

Optionally, in some possible embodiments, the plurality of SR configuration information includes second SR configuration information, the second SR configuration information corresponds to the second SR, and the processing module 420 is further configured to:

if a number of transmissions of the second SR reaches the maximum number of transmissions of the second SR, release the PUCCH resource corresponding to each SR configuration information.

Optionally, in some possible embodiments, the processing module 420 is further configured to:

clear downlink allocation information and uplink authorization information delivered by the network device, and cancel sending each SR to be sent; and initiate a random access procedure and reconfigure each of the SR configuration information.

Optionally, in some possible embodiments, the plurality of SR configuration information includes third SR configuration information, where the third SR configuration information has a higher priority than other SR configuration information, the other SR configuration information includes the fourth SR configuration information, the fourth SR configuration information is corresponding to the fourth SR, and the processing module 420 is further configured to:

if a number of transmissions of the fourth SR reaches the maximum number of transmissions of the fourth SR, release the PUCCH resource corresponding to the fourth SR configuration information.

Optionally, in some possible embodiments, the communications module 410 is further configured to:

send the fourth SR by using a PUCCH resource corresponding to the third SR configuration information.

Optionally, in some possible embodiments, the plurality of SR configuration information includes third SR configuration information, where the third SR configuration information has a higher priority than other SR configuration information, the other SR configuration information includes the fourth SR configuration information, the third configuration information is corresponding to the third SR, and the processing module 420 is further configured to:

if a number of transmissions of the third SR reaches the maximum number of transmissions of the third SR, release the PUCCH resource corresponding to each SR configuration information.

Optionally, in some possible embodiments, the processing module 420 is further configured to:

clear downlink allocation information and uplink authorization information delivered by the network device; and initiate a random access procedure and cancel each SR to be sent.

Optionally, in some possible embodiments, the transmission reliability of the PUCCH resource corresponding to the third SR configuration information is higher than the transmission reliability of the PUCCH resource corresponding to the fourth SR configuration information.

It should be understood that the terminal device 400 according to the embodiments of the present application may correspond to the terminal device in the method embodiments of the present application, and the foregoing and other operations and/or functions of the respective units in the terminal device 400 respectively implement the corresponding process of the terminal device in the method 200 shown in FIG. 2, which is not elaborated here for brevity.

Figure 5:
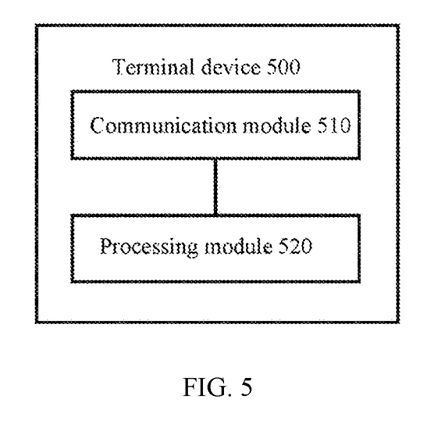
FIG. 5 is a schematic block diagram of a terminal device according to another embodiment of the present application.

FIG. 5 shows a schematic block diagram of a terminal device 500 according to another embodiment of the present application. As shown in FIG. 5, the terminal device 500 includes:

a communication module 510, configured to receive a plurality of Scheduling Request (SR) configuration information of a network device, where each SR configuration information includes a maximum number of transmissions of the SR, and the maximum number of transmissions of the SR is used to indicate a cumulative maximum number of transmissions of all the SRs; and a processing module 520, configured to process Physical Uplink Control Channel (PUCCH) resources corresponding to the plurality of SR configuration information according to the plurality of SR configuration information.

Optionally, in some possible embodiments, the processing module 520 is specifically configured to:

release the PUCCH resource corresponding to each SR configuration information when the cumulative number of transmissions of all the SRs reaches the maximum number of transmissions of the SR.

Optionally, in some possible embodiments, the processing module 520 is further configured to:

clear downlink allocation information and uplink authorization information delivered by the network device; and initiate a random access procedure and cancel each SR to be sent.

It should be understood that the terminal device 500 according to the embodiments of the present application may correspond to the network device in the method embodiments of the present application, and the foregoing and other operations and/or functions of the respective units in the terminal device 500 respectively implement the corresponding process of the terminal device in the method 300 shown in FIG. 3, which is not elaborated here for brevity.

Figure 6:
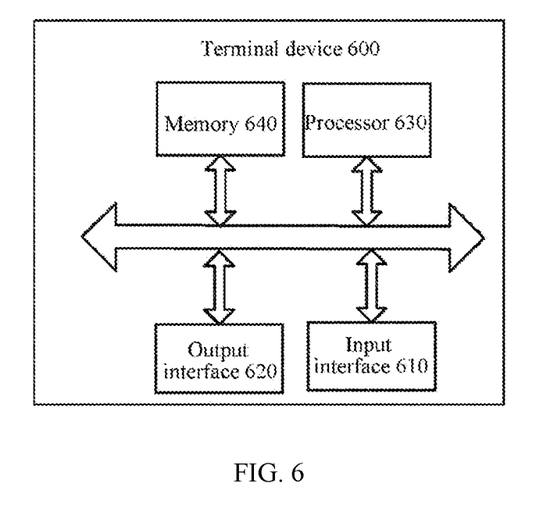
FIG. 6 is a schematic block diagram of a terminal device according to still another embodiment of the present application.

As shown in FIG. 6, the embodiment of the present application further provides a terminal device 600, which may be the terminal device 400 in FIG. 4, and may be used to execute the content of the terminal device corresponding to the method 200 in FIG. 2. The device 600 includes an input interface 610, an output interface 620, a processor 630, and a memory 640. The input interface 610, the output interface 620, the processor 630, and the memory 640 may be connected by a bus system. The memory 640 is used to store programs, instructions or code. The processor 630 is configured to execute the programs, the instructions or the code in the memory 640 to control the input interface 610 to receive a signal, control the output interface 620 to send a signal, and complete the operations in the foregoing method embodiments.

It should be understood that, in the embodiments of the present application, the processor 630 may be a Central Processing Unit ("CPU"), and the processor 630 may also be other general-purpose processor, Digital Signal Processor (DSP), Application Specific Integrated Circuit (ASIC), Field Programmable Gate Array (FPGA) or other programmable logic device, discrete gate or transistor logic device, discrete hardware component, and the like. The general-purpose processor may be a microprocessor or the processor may be any conventional processor or the like.

The memory 640 may include a read only memory and a random access memory, and provides instructions and data to the processor 630. A portion of the memory 640 may also include a non-volatile random access memory. For example, the memory 640 may also store information of the device type.

In the implementation process, individual contents of the foregoing methods may be completed by an integrated logic circuit of hardware or an instruction in a form of software in the processor 630. The contents of the methods disclosed in the embodiments of the present application may be directly implemented by a hardware processor, or may be performed by a combination of hardware and software modules in the processor. The software module may be located in a conventional storage medium such as a random access memory, a flash memory, a read only memory, a programmable read only memory or an electrically erasable programmable memory, a register, and the like. The storage medium is located in the memory 640, and the processor 630 reads the information in the memory 640 and combines the hardware to complete the contents of the above methods. To avoid repetition, it will not be described in detail here.

In a specific implementation, the communication module 410 in FIG. 4 may be implemented by the input interface 610 and the output interface 620 of FIG. 6, and the processing module 420 of FIG. 4 may be implemented by the processor 630 of FIG. 6.

Figure 7:
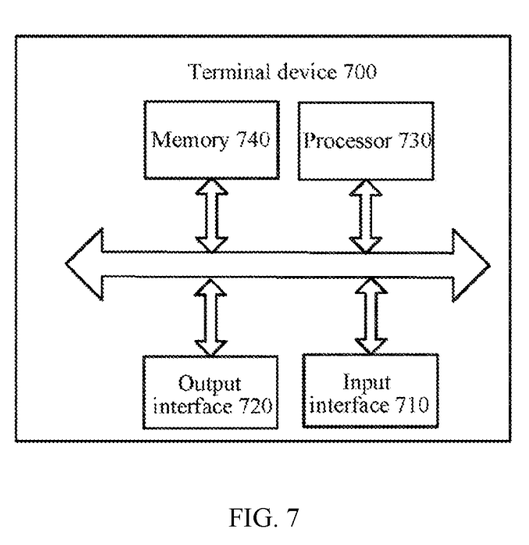
FIG. 7 is a schematic block diagram of a terminal device according to still another embodiment of the present application.

As shown in FIG. 7, the embodiment of the present application further provides a terminal device 700, which may be the terminal device 500 in FIG. 5, and which may be used to execute the content of the terminal device corresponding to the method 300 in FIG. 3. The terminal device 700 includes an input interface 710, an output interface 720, a processor 730, and a memory 740. The input interface 710, the output interface 720, the processor 730, and the memory 740 may be connected by a bus system. The memory 740 is configured to store programs, instructions or code. The processor 730 is configured to execute the programs, the instructions or the code in the memory 740 to control the input interface 710 to receive a signal, control the output interface 720 to send a signal, and complete the operations in the foregoing method embodiments.

It should be understood that, in the embodiments of the present application, the processor 730 may be a Central Processing Unit ("CPU"), and the processor 730 may also be other general-purpose processor, Digital Signal Processor (DSP), Application Specific Integrated Circuit (ASIC), Field Programmable Gate Array (FPGA) or other programmable logic device, discrete gate or transistor logic device, discrete hardware component, and the like. The general-purpose processor may be a microprocessor or the processor may be any conventional processor or the like.

The memory 740 may include a read only memory and a random access memory, and provides instructions and data to the processor 730. A portion of the memory 740 may also include a non-volatile random access memory. For example, the memory 740 may also store information of the device type.

In the implementation process, individual contents of the foregoing methods may be completed by an integrated logic circuit of hardware or an instruction in a form of software in the processor 730. The contents of the methods disclosed in the embodiments of the present application may be directly implemented by a hardware processor, or may be performed by a combination of hardware and software modules in the processor. The software module may be located in a conventional storage medium such as a random access memory, a flash memory, a read only memory, a programmable read only memory or an electrically erasable programmable memory, a register, and the like. The storage medium is located in the memory 740, and the processor 730 reads the information in the memory 740 and combines the hardware to complete the contents of the above methods. To avoid repetition, it will not be described in detail here.

In a specific implementation, the communication module 510 in FIG. 5 may be implemented by the input interface 710 and the output interface 720 of FIG. 7, and the processing module 520 of FIG. 5 may be implemented by the processor 730 of FIG. 7.

Those of ordinary skills in the art may be aware that, the units and algorithm steps of individual examples described in combination with the embodiments disclosed herein, may be implemented by electronic hardware or a combination of computer software and the electronic hardware. Whether the functions are performed by hardware or software depends on particular applications and design constraint conditions of the technical solutions. Those of ordinary skills in the art may use different methods to implement the described functions for each particular application, but it should not be considered that the implementation goes beyond the scope of the present application.

It may be clearly understood by those of ordinary skills in the art that, for the purpose of convenient and brief description, for a detailed working process of the foregoing systems, devices, and units, reference may be made to a corresponding process in the foregoing method embodiments, and details are not described herein again.

In the several embodiments provided in the present application, it should be understood that the disclosed systems, devices and methods may be implemented in other ways. For example, the device embodiments described above are merely illustrative. For example, the division of the units is only one kind of logical function division. In practice, there may be other division manner. For example, a plurality of units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, they may be located in one place, or may be distributed on a plurality of network units. Some or all of the units may be selected according to actual needs to achieve the objectives of the solutions in the embodiments.

In addition, each functional unit in each embodiment of the present disclosure may be integrated in one processing unit, or each unit may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the related art or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk, or an optical disk.

The foregoing descriptions are merely detailed embodiments of the present disclosure, and the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be subjected to the protection scope of the claims.

What is claimed is:

1. A method for uplink transmission, comprising:
    receiving, by a terminal device, a plurality of Scheduling Request (SR) configuration information of a network device, wherein each SR configuration information comprises a maximum number of transmissions of a corresponding SR; and
    processing, by the terminal device, Physical Uplink Control Channel (PUCCH) resources corresponding to the plurality of SR configuration information according to the plurality of SR configuration information,
    wherein the plurality of SR configuration information comprises second SR configuration information, the second SR configuration information corresponds to a second SR, and the processing, by the terminal device, the Physical Uplink Control Channel (PUCCH) resources corresponding to the plurality of SR configuration information according to the plurality of SR configuration information comprises:
        when a number of transmissions of the second SR reaches the maximum number of transmissions of the second SR, releasing, by the terminal device, the PUCCH resource corresponding to each SR configuration information, and
    wherein the method further comprises:
        clearing downlink allocation information and uplink authorization information delivered by the network device, and cancelling sending each SR to be sent, by the terminal device; and
        initiating a random access procedure by the terminal device.

2. The method according to claim 1, wherein the plurality of SR configuration information further comprises first SR configuration information, the first SR configuration information corresponds to a first SR, and the processing, by the terminal device, the Physical Uplink Control Channel (PUCCH) resources corresponding to the plurality of SR configuration information according to the plurality of SR configuration information comprises:
    when a number of transmissions of the first SR reaches the maximum number of transmissions of the first SR, releasing, by the terminal device, a PUCCH resource corresponding to the first SR configuration information.

3. The method according to claim 2, further comprising:
    initiating a random access procedure and requesting to acquire the PUCCH resource corresponding to the first SR configuration information, by the terminal device.

4. The method according to claim 1, further comprising:
    reconfiguring each of the SR configuration information, by the terminal device.

5. The method according to claim 1, wherein the second SR configuration information has a higher priority than other SR configuration information, said other SR configuration information comprises third SR configuration information, the third SR configuration information corresponds to a third SR, and the processing, by the terminal device, the Physical Uplink Control Channel (PUCCH) resources corresponding to the plurality of SR configuration information according to the plurality of SR configuration information comprises:
    when a number of transmissions of the third SR reaches the maximum number of transmissions of the third SR, releasing, by the terminal device, a PUCCH resource corresponding to the third SR configuration information.

6. The method according to claim 5, further comprising:
    sending, by the terminal device, the third SR by using the PUCCH resource corresponding to the second SR configuration information.

7. The method according to claim 5, wherein a transmission reliability of the PUCCH resource corresponding to the second SR configuration information is higher than a transmission reliability of the PUCCH resource corresponding to the third SR configuration information.

8. A method for uplink transmission, comprising:
    receiving, by a terminal device, a plurality of Scheduling Request (SR) configuration information of a network device, wherein each SR configuration information comprises a maximum number of transmissions of the SR, and the maximum number of transmissions of the SR is used to indicate a cumulative maximum number of transmissions of all the SRs; and
    processing, by the terminal device, Physical Uplink Control Channel (PUCCH) resources corresponding to the plurality of SR configuration information according to the plurality of SR configuration information, wherein the processing, by the terminal device, the Physical Uplink Control Channel (PUCCH) resources corresponding to the plurality of SR configuration information according to the plurality of SR configuration information comprises:
   releasing, by the terminal device, the PUCCH resource corresponding to each SR configuration information, in a case that a cumulative number of transmissions of all the SRs reaches the maximum number of transmissions of the SR,
wherein the method further comprises:
   clearing, by the terminal device, downlink allocation information and uplink authorization information delivered by the network device; and
   initiating a random access procedure and cancelling sending each SR to be sent, by the terminal device.

9. A terminal device, comprising:
a memory;
a processor;
an input interface; and
an output interface,
wherein the memory, the processor, the input interface, and the output interface are connected by a bus system, the memory is configured for storing instructions, and the processor is configured for executing the instructions stored in the memory to:
   receive a plurality of Scheduling Request (SR) configuration information of a network device, wherein each SR configuration information comprises a maximum number of transmissions of a corresponding SR; and
   process Physical Uplink Control Channel (PUCCH) resources corresponding to the plurality of SR configuration information according to the plurality of SR configuration information,
wherein the plurality of SR configuration information comprises second SR configuration information, the second SR configuration information corresponds to the second SR, and the processor is further configured for executing the instructions stored in the memory to:
   when a number of transmissions of the second SR reaches the maximum number of transmissions of the second SR, release the PUCCH resource corresponding to each SR configuration information,
wherein the processor is further configured for executing the instructions stored in the memory to:
   clear downlink allocation information and uplink authorization information delivered by the network device, and cancel sending each SR to be sent; and
   initiate a random access procedure.

10. The terminal device according to claim 9, wherein the plurality of SR configuration information comprises first SR configuration information, the first SR configuration information corresponds to the first SR, and the processor is further configured for executing the instructions stored in the memory to:
   when a number of transmissions of the first SR reaches the maximum number of transmissions of the first SR, release a PUCCH resource corresponding to the first SR configuration information.

11. The terminal device according to claim 10, wherein the processor is further configured for executing the instructions stored in the memory to:
   initiate a random access procedure, and request to acquire the PUCCH resource corresponding to the first SR configuration information.

12. The terminal device according to claim 9, wherein the processor is further configured for executing the instructions stored in the memory to:
   reconfigure each of the SR configuration information.

13. The terminal device according to claim 9, wherein the second SR configuration information has a higher priority than other SR configuration information, and said other SR configuration information comprises third SR configuration information, the third SR configuration information corresponds to a third SR, and the processor is further configured for executing the instructions stored in the memory to:
   when a number of transmissions of the third SR reaches the maximum number of transmissions of the third SR, release the PUCCH resource corresponding to the third SR configuration information.

14. The terminal device according to claim 13, wherein the processor is further configured for executing the instructions stored in the memory to:
   send the third SR by using the PUCCH resource corresponding to the second SR configuration information.

15. The terminal device according to claim 13, wherein a transmission reliability of the PUCCH resource corresponding to the second SR configuration information is higher than a transmission reliability of the PUCCH resource corresponding to the third SR configuration information.

16. A terminal device, comprising:
a memory;
a processor;
an input interface; and
an output interface,
wherein the memory, the processor, the input interface, and the output interface are connected by a bus system, the memory is configured for storing instructions, and the processor is configured for executing the instructions stored in the memory to:
   receive a plurality of Scheduling Request (SR) configuration information of a network device, wherein each SR configuration information comprises a maximum number of transmissions of the SR, and the maximum number of transmissions of the SR is used to indicate a cumulative maximum number of transmissions of all the SRs; and
   process Physical Uplink Control Channel (PUCCH) resources corresponding to the plurality of SR configuration information according to the plurality of SR configuration information,
wherein the processor is further configured for executing the instructions stored in the memory to:
   release the PUCCH resource corresponding to each SR configuration information in a case that a cumulative number of transmissions of all the SRs reaches the maximum number of transmissions of the SR;
   clear downlink allocation information and uplink authorization information delivered by the network device; and
   initiate a random access procedure and cancel sending each SR to be sent.

\* \* \* \* \*